Sept. 20, 1949.  R. D. DE WAARD ET AL  2,482,470
METHOD OF AND DEVICE FOR TESTING CREASE RESISTANCE
Filed Oct. 11, 1946  3 Sheets-Sheet 1

INVENTORS
RUSSELL D. DEWAARD
CHARLES R. STOCK
BY
Ellis S. Middleton
ATTORNEY

Sept. 20, 1949.    R. D. DE WAARD ET AL    2,482,470
METHOD OF AND DEVICE FOR TESTING CREASE RESISTANCE
Filed Oct. 11, 1946    3 Sheets-Sheet 2
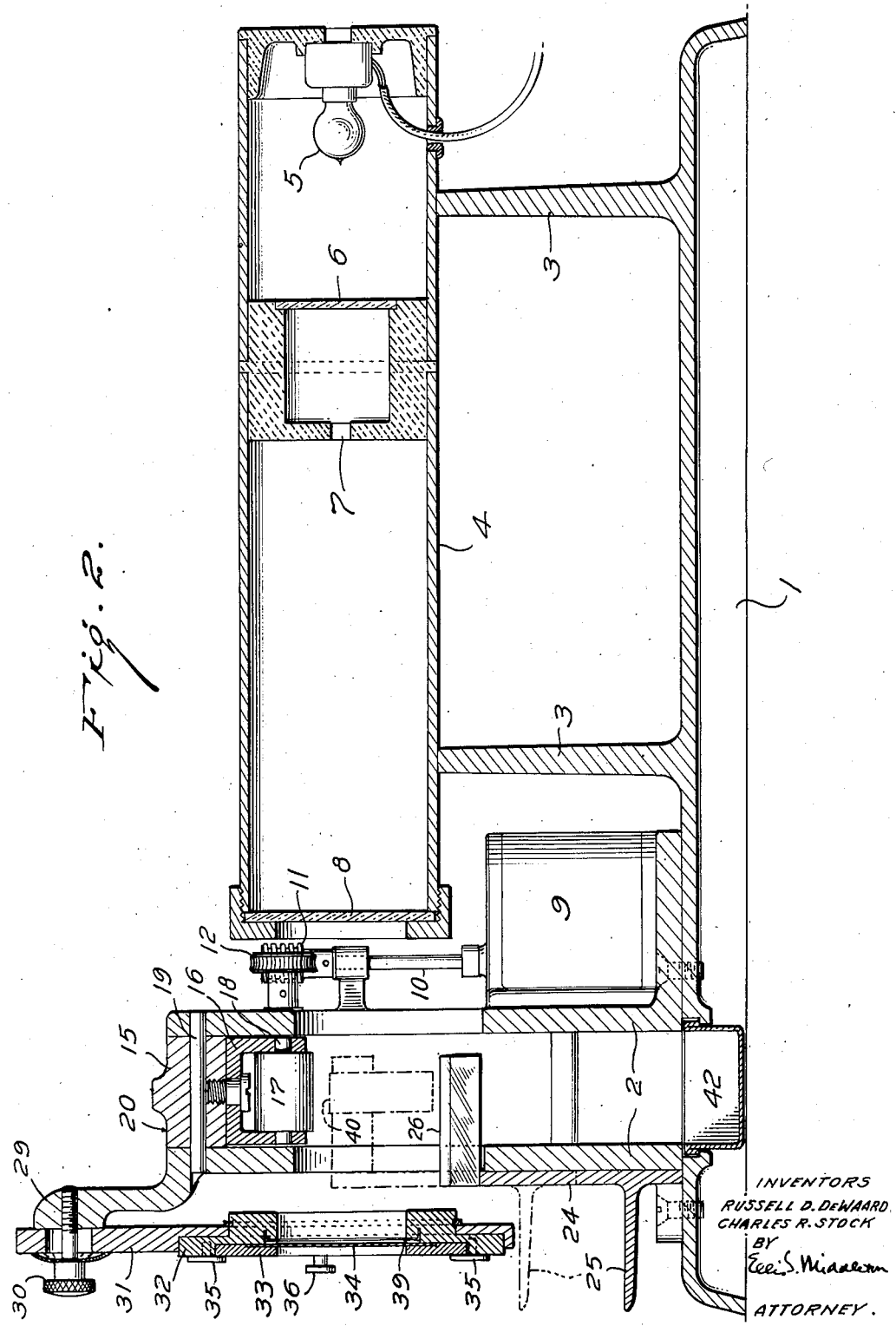
INVENTORS
RUSSELL D. DeWAARD
CHARLES R. STOCK
BY
Eee S. Middleton
ATTORNEY.

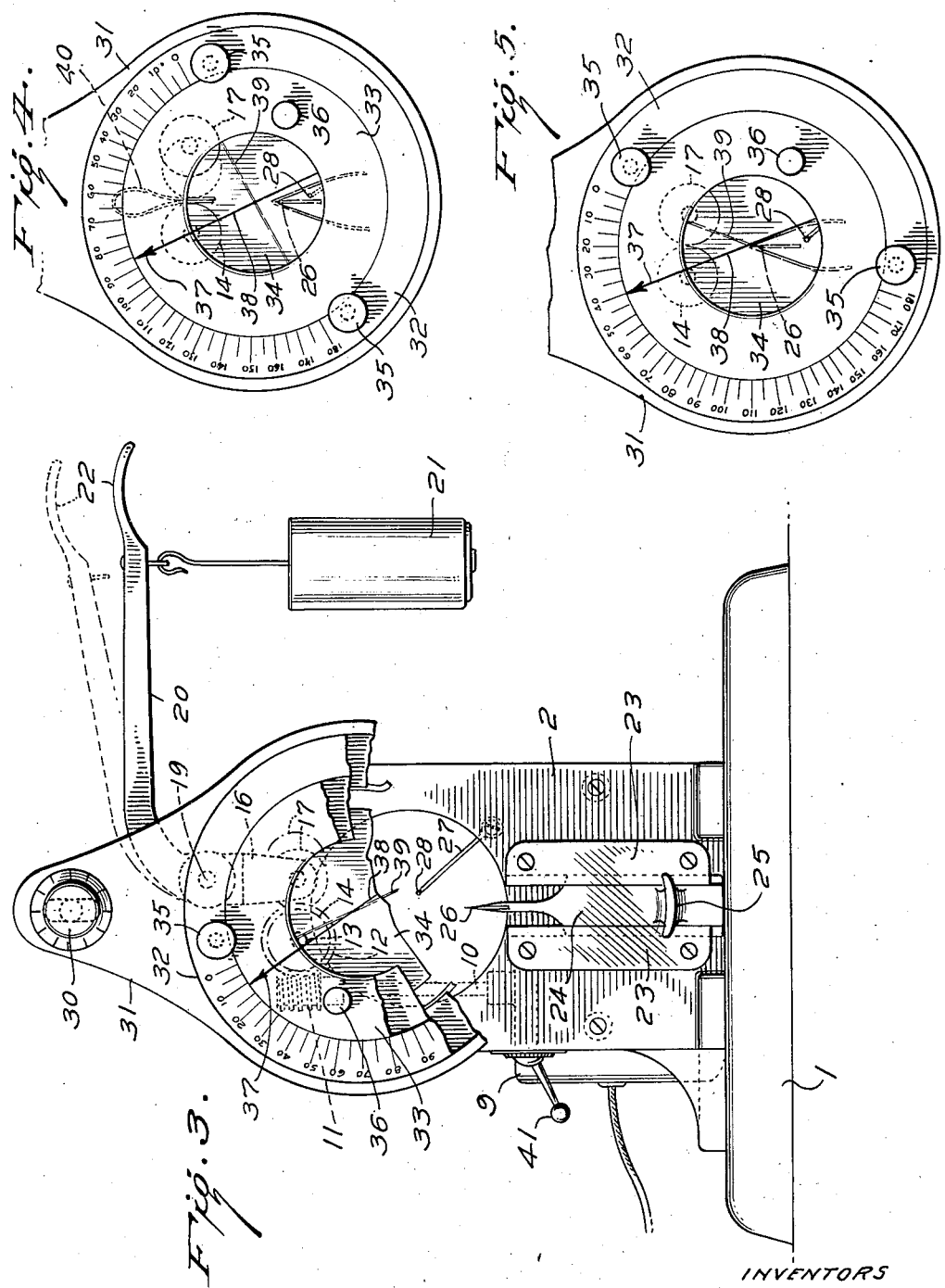

Patented Sept. 20, 1949

2,482,470

UNITED STATES PATENT OFFICE 2,482,470

METHOD OF AND DEVICE FOR TESTING CREASE RESISTANCE

Russell D. De Waard, Riverside, and Charles R. Stock, South Norwalk, Conn., assignors to American Cyanamid Company, New York, N. Y., a corporation of Maine Application October 11, 1946, Serial No. 702,684

7 Claims. (Cl. 73—100)

The present invention relates to a method and apparatus for determining crease resistance of sheet material, and particularly that of textile fabrics.

The principal object of the invention is to provide a method and apparatus for accomplishing the above which will guarantee more uniform results than any method or apparatus used heretofore. Another important object of the invention is to provide an apparatus for the above purpose which will facilitate tests of this character in that they may be accomplished more accurately and in a much shorter space of time than has been possible heretofore.

The heretofore accepted procedure for determining crease resistance is known in the trade as the Tootal, Broadhurst & Lee procedure. This method includes folding a 4 cm. by 1 cm. sample of the material across its narrow dimension and placing a pre-determined weight thereon for a pre-determined length of time, removing the weight, picking up the creased sample and hanging it (supported at the apex) upon a thin wire, and finally measuring the separation of the ends on a scale. This test, therefore, measures crease resistance in terms of partial recovery toward the initial flat state of the sample.

This procedure is objectionable for several reasons: namely, (1) it necessitates handling of the sample during a test which may distort the sample; (2) it stipulates measurement between the ends of the folded sample which measurement depends not only upon the crease, but also upon the shape of the hanging legs.

An important object of the invention is, therefore, to provide a method and apparatus which is not subject to the deficiencies of the prior accepted procedure.

To this end, the invention contemplates folding a standard sized sample of material to be tested, passing this folded material through a pair of rollers under pre-determined pressure so as to form a crease in the folded material, dropping the thus creased material onto a support which may take the form of a relatively thin and sharp horizontal supporting edge, and upon recovery of the creased sample, measuring the angle between the separated legs thereof with a protractor device.

The invention further contemplates ejecting or kicking out the sample so as to make way for another specimen to be tested.

The invention further contemplates the details of the method and the apparatus for accomplishing the above purpose as more fully hereinafter described and shown in the accompanying drawings.

In the drawings:

Fig. 2 is a longitudinal sectional side view of the device of Fig. 1.

Fig. 3 is a front view of the device of Figs. 1 and 2, partially broken away.

Fig. 4 is a fragmentary front view of parts of the device showing the specimen being passed through the creasing rollers.

Fig. 5 is a partial front view of the adjustable protractor device in reading position.

Figure 1:
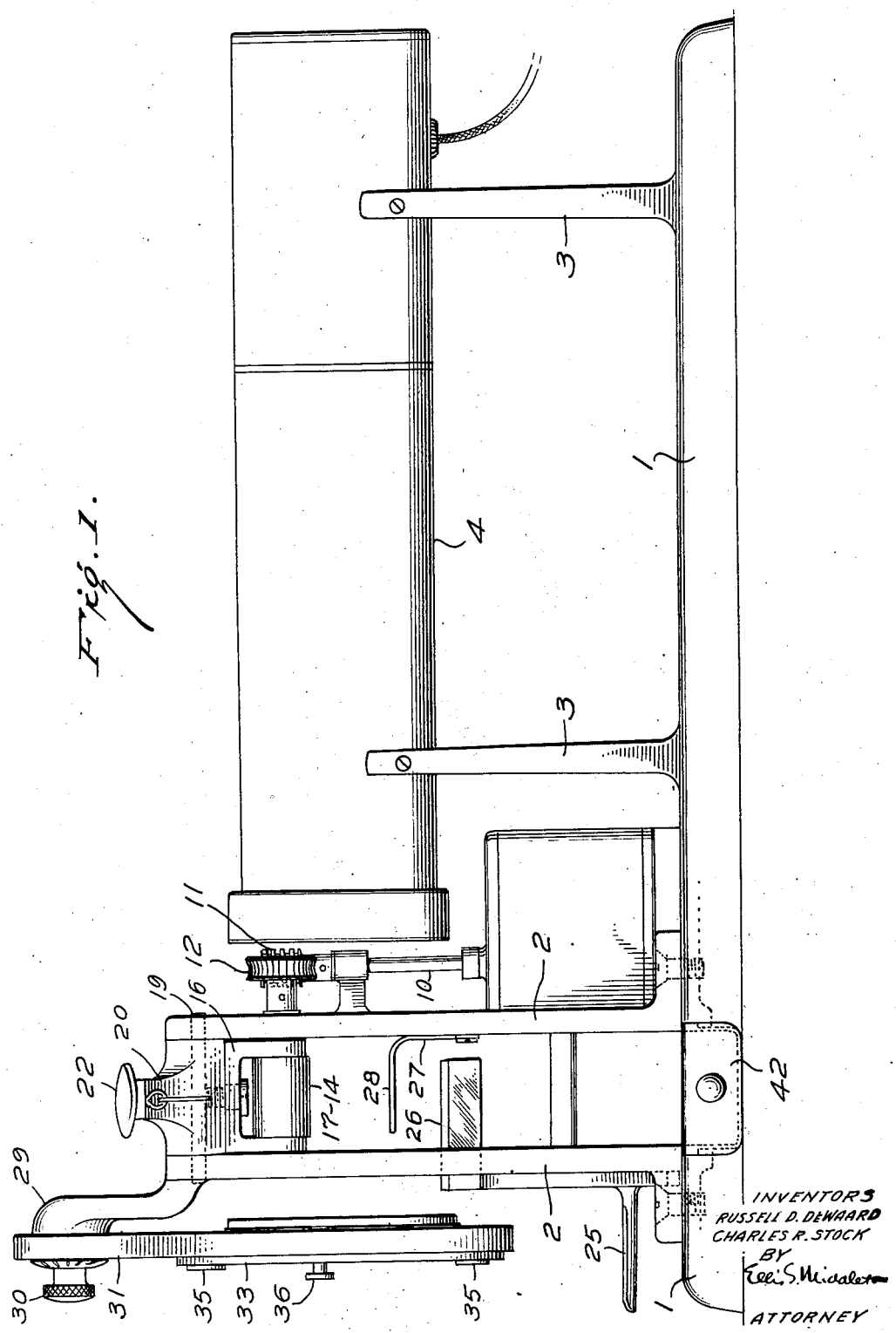
Fig. 1 is a side view of a device embodying the present invention.

Referring now with particularity to the embodiment illustrated, the base is shown at 1 carrying a pair of standards 2 at the front and a pair of standards 3 at the rear thereof. The rear standards support a housing 4 carrying a light source 5 which projects its beam through a heat filter 6, aperture 7 and a second heat filter 8 at the front end of the device.

Also mounted on the base is a motor 9 having a shaft 10 carrying a worm 11 meshing with gear 12 carried on driven shaft 13 carrying driven roller 14. Movably fixed in an overhead support 15 is a bifurcated element 16 carrying an idler roller 17 on stub shaft 18. From an inspection of Fig. 3 it will be apparent that the two rollers are opposed to each other and that due to the loose connection between the bifurcated element and the support 15, the axes of rollers 14 and 17 may be brought into parallelism. The support 15 is mounted on a stub shaft 19 carried between the front pair of supports 2 and this support 15 is provided with a bell crank 20 adapted to carry a variety of weights of different value, one of which is shown at 21. The bell crank terminates in a handle 22. Thus it will be seen that by reason of weight 21, the idler roller 17 is forced into parallelism with and against driven roller 14.

Fixed to the foremost of the front supports 2 are a pair of retaining plates 23 between which is mounted in a slidable manner a holder 24 having a manipulating handle 25 and carrying a supporting edge 26, preferably sharp and having its upper edge horizontal. It is also preferred that the position of the edge 26 be in parallelism with the axis of the driven roller 14 and substantially beneath that edge which would normally contact with the edge of the idler roller. The retaining plates 23 make contact with the edge support 26 in such a manner that by proper manipulation of the handle 25, the edge may be lowered or raised at will and retained in any desired position.

An ejector device which may comprise a fixture 27 secured to one of the supports 2 is provided with a horizontally projecting arm portion 28 extending near the path of the supporting edge 26 during its raising or lowering.

Also mounted on one of the front supports 2 is an extension 29 to which is fixed by knurled nut 30 a plate 31. In an annulus in the plate is mounted ring 32 which in turn mounts an inner ring 33 with a translucent element 34 secured therebetween. Embedded buttons 35 carried by the outer ring 32 prevent displacement of the inner ring 33 and at the same time permitting relative rotary movement between the rings 32 and 33. A projection 36 carried by the inner ring 33 enables the operator to rotate the same at will with relation to the outer ring 32.

The outer ring 32 is provided with angular markings on its front face with the center of the ring 32 as its center. The inner ring 33 is provided with a radial arrow 37 in line with the angular markings on the face of the outer ring 32. An extension 38 of this arrow marking 37 is permanently made across the face of the translucent disc 34. Due to the fact the the disc 34 is secured to the inner ring 33 and moves therewith, the arrow 37 and its extension 38 form a continuous line across the diameter of the disc 34 and through its center to any one of the angular markings on the face of the outer ring 32. A wire 39 carried by the outer ring 32 is arranged to extend between the zero and 180° marked on the outer ring 32 and also to cross the diameter of the disc 34 and the permanent line 39 so as to intersect the latter at the center of the disc. Thus when the light source 5 is illuminated, the shadow of the wire 39 is cast upon the translucent disc 34 substantially as indicated.

In operation and where it is desired to determine the crease resistance of a standard sample of material, say for instance a sheet of fabric 4 cm. by 1 cm., the operator places the two ends of the sample together, lifts the handle 22 so as to separate the two rollers and inserts the sample between them so as to permit the folded portion 40 to clear the rollers without creasing. Upon release of the handle 22, the weight 21 pushes the rollers together in parallelism and pinches the two ends of the sample together. If desired, the two juxtaposed ends of the samples undergoing test may be inserted in the rollers from the top of the device. Throwing of the starter switch 41 starts the motor which rotates driven roller 14 in a clockwise direction and thus feeds the folded sample of material downwardly between the rollers under the pre-determined pressure of the removable weight 21. In the meantime, the supporting edge 26 has been raised so that it is well above the horizontal arm 28 of the fixture 27. In this position, the specimen having been creased drops from between the rollers immediately upon the edge support. The light source 5 being illuminated, the shadow of the folded specimen will appear upon the translucent disc 34 as shown in Fig. 5. As soon as the legs of the creased material have opened up to a maximum extent consistent with the creasing pressure, which waiting time is a predetermined one in standard procedure, the supporting edge 26 is moved up or down as the case may be so as to permit the shadow of the apex of the two legs of the material under test to coincide with the center of the disc 34 as shown in Fig. 5. At this point, the outer ring 32 is moved by hand until the shadow of the wire 39 is tangent to the shadow of one of the legs of the folded material at the apex. The inner ring 33 is then manipulated until the line 38 is similarly tangent to the other leg of the folded material and the angle between the legs is measured at the apex directly on the outer ring between the zero point and the point indicated by the arrow 37.

By the above method, it will be apparent that the human element has been largely eliminated from the test as the crease was put in the material mechanically under pre-determined pressure and the sample dropped immediately after the crease upon the supporting edge and the angle between the legs measured without in any way touching the tested sample.

After the angle between the legs has thus been measured, the manipulating handle 25 is lowered which causes one leg of the material tested to catch on the horizontal arm 28 of fixture 27 in an unbalanced manner which, therefore, tips the sample over and deposits it into the basket 42 for disposal. The operation may then be repeated on a new sample.

It will be apparent that the above instrumentalities are of particular advantage in testing crease resistance of sheet materials in that the operator is assured of uniformity of pressure applied in the making of the crease which has been one of the difficulties heretofore encountered with testing machines. Also, as soon as the crease has been put in the test specimen, it is immediately dropped onto the supporting edge where it remains and is permitted to recover as far as it will. The projecting of a shadow of the apex of the separated legs of the specimen onto a translucent screen is of material advantage in that it is much easier nd simpler to read the correct angle of separation than could be obtained by a direct viewing of the legs themselves and an attempt to line up a protractor therewith.

The invention is particularly applicable and useful in any laboratory or any industry where basic or exploratory investigation is being undertaken to improve the crease resistance of textile or other sheet material. The machine and method above described enables the operator to handle a large quantity of test materials as a multiplicity of the machines may be set up side by side so that additional samples may be creased and dropped onto the supporting edge while the first sample is being given time to recover.

While the invention has been described with particular reference to specific embodiments, it is to be understood that it is not to be limited thereto but is to be construed broadly and restricted solely by the scope of the appended claims.

We claim:

1. A method of determining the crease resistance of a sheet which includes the steps of folding a sheet upon itself, applying a predetermined pressure to the fold for a predetermined length of time, removing the pressure, hanging the creased sheet over a support, and measuring the angle between the legs of the folded sheet.

2. A method of determining the crease resistance of a sheet which includes the steps of folding a sheet upon itself, applying a predetermined pressure to the fold for a predetermined length of time, removing the pressure, hanging the creased sheet over a support, and measuring the angle between the legs of the folded sheet after the creased sheet has remained on the support a sufficient length of time to establish partial recovery to its initial uncreased state.

3. An apparatus for determining the crease resistance of a sheet which includes opposed creasing rollers, means to bring them together under predetermined pressure against a folded sheet to crease the same, means below the rollers to receive after creasing and to support the pressure creased sheet at the crease, and means to measure the angle between the legs of the creased sheet including relatively rotatable members provided with a zero line and an angle measuring line, respectively, the point of intersection of the lines coinciding with the apex of the folded sheet when the latter is supported by said supporting means, the rollers, the pressure producing means, the creased sheet support and the angle measuring means being supported from a common base.

4. The apparatus of claim 3 with means to drive one of the said rollers.

5. The apparatus of claim 3 with means to vary the pressure of one roller on the other.

6. The apparatus of claim 3 with an ejector device located beneath the support for ejecting the sheet after completion of the test.

7. The apparatus of claim 3 with an ejector device located beneath the support for ejecting the sheet after completion of the test, the creased sheet support being movable with relation to the ejector so as to eject the sheet upon completion of the test.

RUSSELL D. DE WAARD.
CHARLES R. STOCK.

REFERENCES CITED

The following references are of record in the file of this patent:

UNITED STATES PATENTS

| Number | Name | Date |
| --- | --- | --- |
| 1,233,222 | Green | July 10, 1917 |
| 1,491,949 | Francke | Apr. 29, 1924 |